United States Patent [19]

Walker et al.

[11] Patent Number: 4,794,095
[45] Date of Patent: Dec. 27, 1988

[54] CATALYTIC CRACKING CATALYST

[75] Inventors: Darrell W. Walker, Media, Pa.; Fu M. Lee, Bartlesville, Okla.

[73] Assignee: Phillips Petroleum Company, Bartlesville, Okla.

[21] Appl. No.: 69,553

[22] Filed: Jul. 2, 1987

[51] Int. Cl.$^4$ .......................... B01J 29/06; B01J 29/08
[52] U.S. Cl. .......................................... 502/64; 502/79
[58] Field of Search ........................ 502/64, 65, 70, 79

[56] References Cited

U.S. PATENT DOCUMENTS

| | | | |
|---|---|---|---|
| 3,413,238 | 11/1968 | Gladrow et al. | 502/64 |
| 3,437,586 | 4/1969 | Weisz | 208/110 |
| 3,718,553 | 2/1973 | Stover | 208/120 |
| 3,816,342 | 6/1974 | Plank et al. | 252/455 Z |
| 3,944,482 | 3/1976 | Mitchell et al. | 502/64 |
| 3,945,943 | 3/1976 | Ward | 252/455 Z |
| 4,158,621 | 6/1979 | Swift et al. | 208/114 |
| 4,182,693 | 1/1980 | Gladrow | 252/455 Z |
| 4,198,320 | 4/1980 | Chester et al. | 502/64 |
| 4,200,520 | 4/1980 | Gladrow et al. | 208/120 |
| 4,244,810 | 1/1981 | Youngblood et al. | 208/120 |
| 4,292,169 | 9/1981 | Gladrow | 208/120 |
| 4,326,993 | 4/1982 | Chester et al. | 252/455 Z |
| 4,377,470 | 3/1983 | Hettinger, Jr. et al. | 208/120 |
| 4,424,116 | 1/1984 | Hettinger, Jr. | 208/120 |

OTHER PUBLICATIONS

S. Jaras, "Rapid Methods of Determining the Metals Resistance of Cracking Catalysts", Applied Catalysis, 2, (1982), 207–218.

J. Gary and G. Handwerk, "Petroleum Refining", Marcel Dekker, 1975, pp. 86–95, 101, 110, 111.

Primary Examiner—Carl F. Dees
Attorney, Agent, or Firm—K. K. Brandes

[57] ABSTRACT

A composition of matter, suitable as cracking catalyst, comprises zeolite, silica matrix and vanadium oxide(s) at a level of at least 0.2 weight-% V. A process for preparing the above composition of matter comprises the steps of contacting zeolite in a silica matrix with at least one vanadium compound and calcining the thus contacted material. A process for cracking substantially liquid hydrocarbon-containing feed streams, which contain at least about 5 ppmw vanadium, in the presence of the above composition of matter as catalyst, is provided.

19 Claims, 1 Drawing Sheet

CATALYTIC CRACKING CATALYST

BACKGROUND OF THE INVENTION

In one aspect, this invention relates to an effective cracking catalyst composition. In another aspect, this invention relates to a process for preparing a cracking catalyst composition. In a further aspect, this invention relates to a catalytic cracking process.

Cracking catalysts comprising zeolite embedded in silica-containing matrix materials are known. Also the use of these catalysts for cracking of hydrocarbon oils, such as gas oil, is known. However, with the increasing use of heavier feedstocks which contain metals, such as vanadium, the problem of poisoning and deactivation of cracking catalysts by these metals has become an increasingly serious problem in the refinery industry. This invention is directed to alleviating the problem of deactivation of cracking catalyst by vanadium and to actually deriving benefits from vanadium deposition on zeolite-containing catalyst compositions.

SUMMARY OF THE INVENTION

It is an object of this invention to provide an effective cracking catalyst composition. It is another object of this invention to provide a process for preparing an effective cracking catalyst composition. It is a further object of this invention to provide an improved process for cracking hydrocarbon-containing feedstocks which contain vanadium compounds as impurities. Other objects and advantages will become apparent from the detail description and the appended claims.

In accordance with this invention, there is provided a composition of matter (effective as a cracking catalyst composition) comprising
 (a) zeolite,
 (b) silica matrix material (in which said zeolite is embedded) containing substantially no alumina, preferably having a BET/$N_2$ surface area in excess of about 100 $m^2/g$, measured substantially in accordance with ASTM D3037, and
 (c) at least one vanadium oxide at a total level of at least about 0.2 weight-% V (based on the entire composition of matter).

Also in accordance with this invention, a process for preparing a composition of matter (suitable as a cracking catalyst composition) comprises the steps of (I) contacting (i) a material comprising zeolite embedded in a matrix material consisting essentially of silica (preferably having a BET/$N_2$ surface area in excess of about 100 $m^2/g$) with (ii) at least one vanadium compound (preferably dissolved in a liquid hydrocarbon-containing stream) under such conditions as to incorporate said at least one vanadium compound (ii) into said material (i) at a total level of at least one 0.2 weight-% V; and (II) heating the material obtained in step (I) in a free oxygen containing gas under such conditions as to substantially convert said at least one vanadium compound to at least one vanadium oxide.

Further in accordance with this invention, a catalytic cracking process comprises the step of (A) contacting a substantially liquid hydrocarbon-containing feed stream, which has an initial boiling point under atmospheric pressure conditions in excess of about 500° F. and which contains at least about 5 ppmw vanadium (preferably about 5-200 ppmw V), with a cracking catalyst composition comprising
 (a) zeolite,
 (b) silica matrix material (in which zeolite is embedded) containing substantially no alumina, preferably having a BET/$N_2$ surface area in excess of about 100 $m^2/g$, and
 (c) at least one vanadium oxide at a total level of at least about 0.2 weight-% V (based on the entire cracking catalyst composition), under such cracking conditions as to obtain at least one liquid product stream having a lower initial boiling point and a higher API gravity than said feed stream.

DETAILED DESCRIPTION OF THE INVENTION CRACKING CATALYST COMPOSITION

Figure 1:
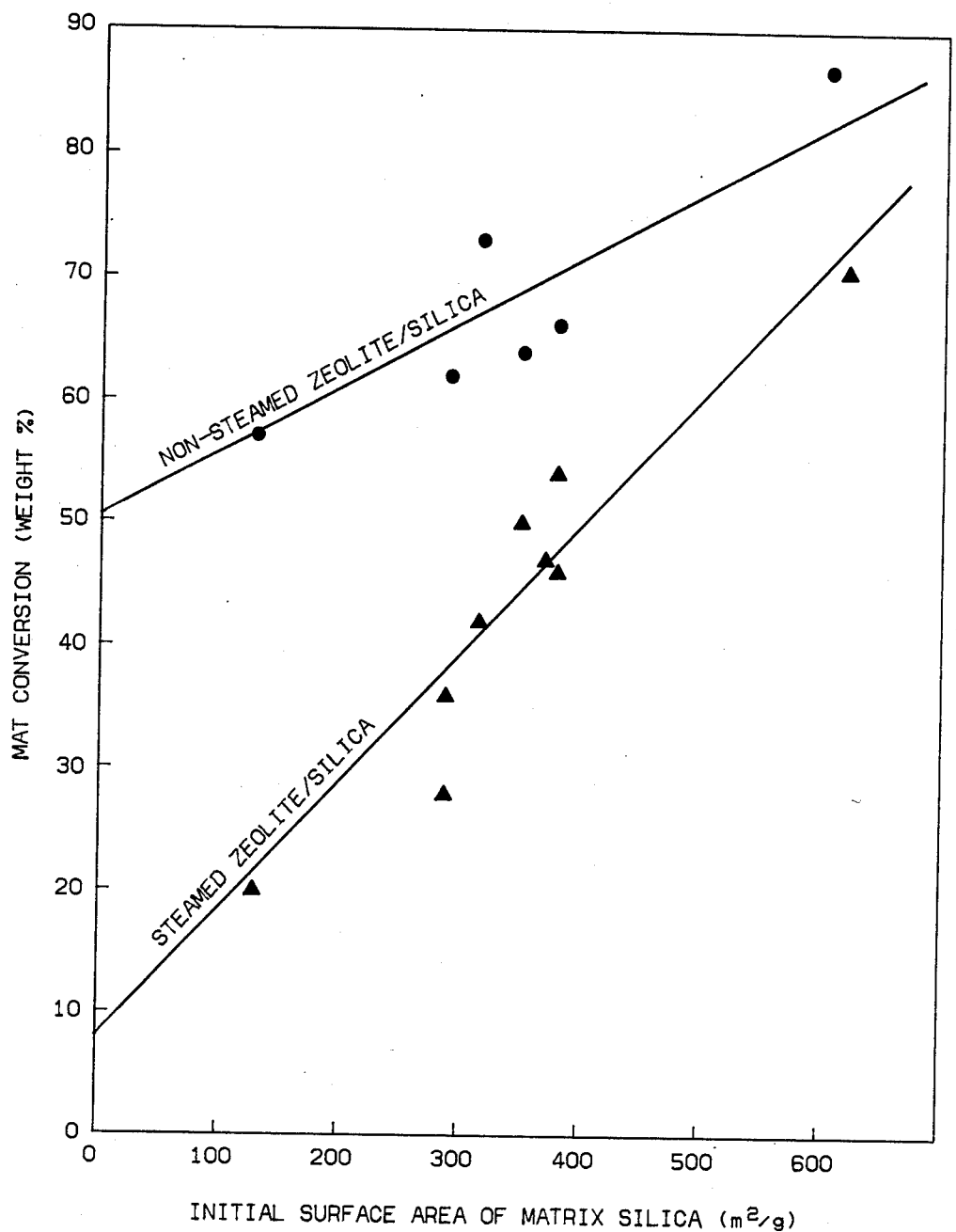
FIG. 1 shows the dependence of hte cracking activity of a zeolite/silica catalyst on the initial surface area of the silica matrix material.

The zeolite component of the composition of matter (cracking catalyst composition) of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM, and the like, and mixtures thereof. Additional examples of suitable zeolites are listed in U.S. Pat. No. 4,158,621, hereby incorporated by reference. It is within the scope of this invention to use zeolites from which a portion of Al has been removed from the crystalline framework, and/or which have been ion-exchanged with rare earth metal or ammonium or by other conventional ion-exchange methods. Preferably, a synthetic faujasite of the Y-type (zeolite Y), more preferably a rare earth-exchanged zeolite Y (REY zeolite), is employed as catalyst component (a). The BET/$N_2$ surface area of the zeolite preferably ranges from about 200 to about 1,000 $m^2/g$.

The silica matrix material (b) consists essentially of any silica, which preferably has a BET/$N_2$ surface area in excess of about 100 $m^2/g$, more preferably in the range of from about 200 to about 1,000 $m^2/g$, most preferably in the range of from about 200 to about 700 $m^2/g$. The silica matrix material should be substantially free of alumina. i.e., essentially no alumina or only trace amounts of alumina of less than about 0.5 weight-%, preferably less than about 0.1 weight-% should be present in the silica. The silica matrix materials can be prepared by any suitable method, such as precipitation of a hydrated silica gel from an aqueous solution, followed by calcining (heating in air or any other suitable gas atmosphere); or by flame hydrolysis of volatile silicon compounds, and the like. The presently preferred method of preparing high surface area silica comprises adding an aqueous solution of a strong acid (more preferably $H_2SO_4$) to a solution of an alkali metal silicate (more preferably sodium silicate), so as to precipitate a hydrated silica gel at a pH of about 4-6; allowing the hydrated silica gel to set and age while in contact with the mixture of the two solutions (more preferably for about 0.5-2 hours at about 20°-30° C.); separating the aged hydrated silica gel from the solution; washing the separated hydrated silica gel (more preferably with water and aqueous solutions of ammonium salts, such as ammonium sulfate); drying the washed hydrated silica gel (more preferably at about 100°-200° C.); and calcined the dried hydrated silica gel so as to remove substantially all water (more preferably in air at about 600°–700° C., for about 1–5 hours).

The zeolite component (a) can be embedded in the silica matrix material (b) in any suitable manner. Preferably, a slurry of the zeolite (more preferably in water) and a slurry of the silica matrix material (more preferably in water) are mixed; the dispersed zeolite/silica mixture is separated by any suitable method (more preferably by filtration) from the liquid portion of the slurry mixture; the separated intimate zeolite/silica mixture is dried (more preferably after washing with water and an aqueous ammonium salt solution), and then calcined (more preferably in air, at about 600°–700° C. for about 1–5 hours). The zeolite/silica material can be ground and sieved during any phase of the preparation (preferably after drying) so as to obtain a material having a desired particle size range. The calcined intimate mixture of zeolite and silica (i.e., zeolite embedded in a silica matrix) generally has a BET/$N_2$ surface area in the range of from about 100 to about 800 $m^2/g$, preferably from about 200 to about 600 $m^2/g$. Generally, the weight ratio of zeolite to silica is in the range of from about 1:30 to about 1:1, preferably from about 1:15 to about 1:4.

The vanadium oxide (c) can be incorporated into the catalyst composition of this invention in any suitable manner. In one embodiment, the zeolite/silica material (zeolite embedded in a silica matrix) is first impregnated with a solution (dissolved in water or in a suitable organic solvent such as toluene) of a suitable vanadium compound. Non-limiting examples of suitable vanadium compounds are ammonium ortho-, pyro- or metavanadates, hydrated forms of vanadium oxides, vanadic acids, vanadium carboxylates, vanadyl carboxylates (preferably vanadyl naphthenate), vanadium sulfate, vanadyl sulfate, vanadium nitrate, vanadyl nitrate, and the like, and mixtures thereof. The thus impregnated zeolite/silica material is subsequently dried (preferably at about 100°–200° C. in air) and then calcined in a free oxygen containing gas (preferably air) so as to substantially convert the vanadium compound contained therein to at least one vanadium oxide (such as $VO$, $V_2O_3$, $VO_2$, $V_2O_5$). Preferably, the calcination of the vanadium-impregnated material carried out at a temperature in the range of from about 500° to about 700° C., more preferably for a time period of about 0.1 to about 10 hours.

In another embodiment of this invention, the zeolite/silica material is contacted in a cracking reactor with a substantially liquid hydrocarbon-containing feed stream, which contains vanadium compounds as impurities at a level of at least about 5 ppmw (i.e., 5 parts by weight of V per million parts by weight of feed), preferably about 5 to about 200 ppmw V, more preferably about 5 to about 100 ppmw V, under such cracking conditions as to produce lower boiling hydrocarbons and to thermally decompose at least a portion of the vanadium compounds contained in the feed stream. Suitable hydrocarbon-containing feeds and suitable cracking conditions are described in a later section entitled "Cracking Process". The vanadium-containing zeolite/silica material (i.e., cracking catalyst) is then separated from liquids and gases, heated (calcined) in a free oxygen containing gas e.g., air (preferably after steam-stripping, as described later) so as to burn off coke deposits and to substantially convert deposited metals, in particular vanadium or compounds thereof, to at least one metal oxide, in particular at least one vanadium oxide.

The vanadium oxide content (expressed as weight percent V metal) of the calcined composition of matter of this invention should be at least about 0.2 weight-% V (i.e., about 0.2 weight-% V or higher), and preferably is in the range of from about 0.2 to about 2.0 weight-% V, more preferably from about 0.3 to about 1.0 weight-% V, based on the entire composition of matter (catalyst composition). The BET/$N_2$ surface area of the calcined composition of matter generally is in the range of from about 100 to about 800 $m^2/g$, preferably from about 200 to about 600 $m^2/g$.

CRACKING PROCESS

The hydrocarbon-containing feed stream for the process of this invention can be any feedstock having an initial boiling point (ASTM D 1160) in excess of about 500° F., preferably boiling in the range of from about 500° to about 1300° F., more preferably in the range of from about 650° to about 1200° F. under atmospheric pressure conditions (about 1 atm). The vanadium content of the hydrocarbon-containing feed stream is at least about 5 ppmw V, preferably about 5–200 ppmw V, more preferably about 5–100 ppmw V. The $API_{60}$ gravity (measured at 60° F.) generally is in the range of from about 5 to about 40, preferably from about 10 to about 35. Frequently these feedstocks also contain Ramsbottom carbon residue (ASTM D524; generally about 0.1–20 weight-%), sulfur (generally about 0.1–5 weight-%), nitrogen (generally about 0.05–2 weight-%), and nickel (generally about 0.5–50 ppmw).

Non-limiting examples of suitable feedstocks are vacuum gas oils, cracker recycle oils (cycle oils), cracker slurry oils, cracker decant oils, topped crudes (residua), distillation bottoms fractions, hydrotreated residua (e.g., hydrotreated in the presence of Ni, Co, Mo-promoted alumina catalyst), heavy liquid coal pyrolyzates, heavy liquid products from extraction of coal, heavy liquid products from liquefaction of coal, heavy liquid products from tar sand, shale oils, heavy fractions of shale oils, and the like. Presently most preferred feedstocks are hydrotrated residua.

Any suitable reactor can be used for the catalyst cracking process of this invention. Generally a fluidized-bed catalytic cracking (FCC) reactor (preferably containing one or more risers) or a moving bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116, herein incorporated by reference. The cracking catalyst used in the cracking process of this invention has been described in great detail above in the section entitled "Cracking Catalyst Composition". The cracking catalyst, that has been used in the cracking process (commonly called spent catalyst) contains deposits of coke and metals or compounds thereof (in particular vanadium and vanadium compounds). The spent catalyst is separated from the gases and said at least one liquid product stream by and conventional separation means (e.g., a cyclone), as is described in the above-cited patents and also in "Petroleum Refining" by James H. Gary and Glenn E. Handwerk, Marcel Dekker, Inc., 1975, herein incorporated by reference. Adhered oil is stripped from the spent catalyst, generally by exposure to flowing steam (preferably having a temperature of about 1,000°–1,500° F.), and is then heated in a free oxygen-containing gas stream in the regeneration unit of the cracking reactor, as is shown in the above-cited references. Generally, air is used as the free oxygen containing gas; and the temperature of the catalyst during regeneration with air preferably is about 1100°–1300° F. (i.e. about 600°–700° C.). Substantially all coke deposits are burned off and vanadium deposits (V metal and V compounds) are substantially converted to vanadium oxide (as has been described earlier).

Enough fresh cracking catalyst, which preferably consists essentially of zeolite and silica matrix material, is added to the regenerated cracking catalyst, so as to provide a so-called equilibrium catalyst of desirable cracking activity, having a vanadium oxide content of at least about 0.2 weight-% V, preferably of about 0.2–2.0 weight-% V, more preferably about 0.3–1.0 weight-% V, based on the entire equilibrium cracking catalyst composition. The equilibrium catalyst is then transported by means of a suitable lift gas stream (e.g., steam and/or hydrogen and/or gaseous hydrocarbons) to the cracking unit and is introduced to the cracking reactor.

Specific operating conditions of the cracking operation depend greatly on the type of feed, the type and dimensions of the cracking reactor and the oil feed rate. Examples of operating conditions are described in the above-cited references and in many other publications. In an FCC operation, generally the weight ratio of catalyst to oil feed (i.e., hdyrocarbon-containing feed) ranges from about 2:1 to about 20:1, the contact time between oil feed and catalyst is in the range of about 0.2 to about 2.0 seconds, and the cracking temperature is in the range of from about 800° to about 1200° F. Generally steam is added with the oil feed to the FCC reactor so as to aid in the dispersion of the oil as droplets. Generally the weight ratio of steam to oil feed is in the range of from about 0.01:1 to about 0.5:1. Hydrogen gas can also be added to the cracking reactor; but presently $H_2$ addition is not preferred.

The separation of liquid products into various gaseous and liquid product fractions can be carried out by any conventional separation means, generally fractional distillation. The most desirable product fraction is gasoline (ASTM boiling range: about 180°–400° F.). Non-limiting examples of such separation schemes are shown in "Petroleum Refining" by James H. Gary and Glenn E. Handwerk, cited above.

The following examples are presented to further illustrate the invention and are not to be considered unduly limiting the scope of this invention.

EXAMPLE I

This example illustrates the preparation of zeolite/silica cracking catalysts. First, high surface silica was prepared. To a solution of 165 grams of concentrated sulfuric acid in 1200 cc distilled water was added, with stirring, a sodium silicate solution, which had been (prepared by mixing about 1100 g of a concentrated water glass solution with about 1350 cc water, within a time period of about 10 minutes. The final pH of the mixture of the two solutions was about 5. A silica gel precipitated and then thickened (set) after a time period of about 45 minutes. The set silica gel was then aged at room temperature for about 1 hour, while in contact with the solution.

About 3820 grams of silica gel were slurried, with stirring, in about 1850 grams of water (temperature: 52° C.). 23 grams of aqueous ammonium hydroxide solution was added to the slurry so as to raise the pH to 8.2, and the slurry was aged at room temperature for about 30 minutes. One 950 gram portion of the silica gel slurry was filtered, dried overnight at about 125° C., ground, and sieved. A 20/100 mesh fraction of the dried silica was washed several times with a dilute aqueous $(NH_4)_2SO_4$ solution and subsequently with water, dried at 125° C., and calcined in air at 650° C. for 2–3 hours. The BET/$N_2$ surface area of the calcined silica was 349 $m^2/g$, and its Na content was 0.05 weight-%.

A second portion of the silica gel slurry weighing 2774 grams was mixed with a slurry of 17.0 grams of a rare earth exchanged Y-zeolite (REY-zeolite, provided by Union Carbide Corporation, Danbury, Connecticut; containing 14.1 weight-% rate earth and 2.5 weight-% Na, having a surface area of 546 $m^2/g$) in 200 cc water for about 45 minutes. The slurry mixture was filtered, dried overnight at 125° C., ground and sieved. A 20/100 mesh fraction of the dried zeolite/silica material (zeolite in silica matrix) was washed twice with 1.5 liters of distilled water at room temperature, twice with 1.5 liters of an aqueous $(NH_4)_2SO_4$ solution (containing 3 weight-% $(NH_4)_2SO_4$) at room temperature, and finally twice with 1.5 liters of hot distilled water (75°–95° C.). The thus washed zeolite/silica material was dried (as described above) and calcined at 650° C. in air for about 2–3 hours. The BET/$N_2$ surface area of the calcined zeolite/silica material was 304 $m^2/g$; its Na content was 0.16 weight-%, and its zeolite content was about 8.6 weight-%.

One 35 gram sample of the calcined zeolite/silica material was wetted with 35 cc of toluene, dried on a hot plate, and calcined at about 540° C. (first in $N_2$ for about 1 hour, then in air for about 0.5 hours). This material was labeled control Catalyst A. The BET/$N_2$ surface area of control Catalyst A was 340 $m^2/g$.

A second 35 grams sample of the calcained zeolite/silica material was impregnated with a solution of 5.86 grams of vanadyl naphthenate in 35 cc toluene, dried on a hot plate, and calcined at about 540° C. (first in $N_2$ for about 1 hour, then in air for about 0.5 hours). The vanadyl naphthenate was substantially converted to vanadium oxide(s). The vanadium content of this invention catalyst, labeled Catalyst B, was about 0.5 weight-% V.

Several control catalysts similar to Catalyst A (without V) were prepared substantially in accordance with the procedure described for Catalyst A, wherein the BET/$N_2$ surface area of the calcined silica matrix material varied from about 300 to about 650 $m^2/g$. Several other zeolite/silica control catalysts (without V) contained a silica matrix material which was prepared by adding dilute aqueous sulfuric acid solutions to aqueous sodium silicate solutions so as to attain a pH of about 9–10 and had a lower BET/$N_2$ surface area after calcining: of about 130–380 $m^2g$.

Portions of these various catalysts (containing silica materials of different surface area; with and without vanadium) were steam-treated (steamed) for 4 hours in a flowing stream of 100% steam, at 1 atm and 760° C., so as to simulate the effect of hydrothermal aging expected in a commercial FCC unit (during steam stripping).

Control Catalyst C was a commercial cracking catalyst, HFZ-20, marketed by Engelhard Mineral and Chemicals Corporation, Edison, N.J., containing zeolite embedded in a silica-alumina matrix. The chemical composition of HFZ-20 was: 55 weight-% $Al_2O_3$, 41 weight-% $SiO_2$ and 2.5 weight-% $TiO_2$.

Control Catalyst D contained 0.2 weight-% V and was obtained by impregnation of Catalyst C with vanadyl naphthenate, substantially in accordance with the procedure for Catalyst B (except that Catalyst C was used in lieu of Catalyst A in the impregnation procedure).

EXAMPLE II

This example illustrates the use of steam-aged catalysts described in Example I for cracking of a heavy oil feedstock. The feedstock was a 750° F.+ fraction of a hydrotreated residuum produced by hydrotreatment of an atmospheric residuum in a commercial catalytic desulfurization unit of a Phillips Petroleum Company refinery. The hyrotreated residuum had $API_{60}$ gravity of 18.2, Ramsbottom carbon residue of 5.7 weight-%, sulfur content of 0.45 weight-% nitrogen content of 0.15 weight-%, 8 ppmw nickel, 16 ppmw vanadium and a viscosity at 210° F. of 220 SUS. Note: ppmw means parts by weight per one million parts by weight of feed oil.

An experimental bench-scale unit for testing the invention and control cracking catalysts was used. The heavy oil feed was continuously pumped by means of a syringe pump through a horizontal heated stainless steel tube into a vertical induction tube (about 1/16 inches inner diameter) and then pumped downward by means of a piston pump into a heated fluidized catalyst bed (inner diameter: about 1¼ inches; height: about 4 inches). This catalyst bed was filled with about 35 grams of one of the catalysts of Example I. The catalyst was fluidized by passing an upflow stream of nitrogen gas (about 160 c/minute) through the reactor. The reactor was heated by means of a furnace equipped with temperature control. The reactor temperature was measured by means of a thermocouple located in the midsection of the reactor.

The cracked products exited the reactor through an outlet tube located in the upper side wall of the reactor. The product stream was first passed through a cold trap (temperature: about 0° C.), where essentially all condensable products were collected. The gaseous products flowed through a quartz wool plug into a 4-liter bulb filled with water (at room temperature) which was at least partially replaced by product gases during a test run. Gaseous products were analyzed by means of a gas chromatograph. Liquid products were analyzed for gasoline and cycle oil yields by simulated distillation technique using a gas chromatograph. The amount of coke deposited on the cracking catalyst was determined by weighing the catalyst before and after the test.

Pertinent test data for Catalysts A-D are summarized in Tables I and II. The cracking temperature in all tests was 950° F. (510° C.).

TABLE I

| Catalyst | $A^2$ (Control; no V) | $B^2$ (Invention; with V) | $B^2$ (Invention; with V) | $B^2$ (Invention; with V) |
| --- | --- | --- | --- | --- |
| Catalyst:Oil Weight Ratio | 6.9 | 7.2 | 7.0 | 7.0 |
| Conversion (Vol. %) | 51.7 | 56.3 | 55.5 | 55.9 |
| Gasoline Yield (Vol. %) | 38.1 | 41.7 | 40.6 | 41.2 |
| Light Cycle Oil Yield (Vol. %) | 12.2 | 17.8 | 17.7 | 17.8 |
| Heavy Cycle Oil Yield (Vol. %) | 36.2 | 25.9 | 26.8 | 26.4 |
| Yield of Gases (Wt. %) | 12.4 | 12.2 | 10.9 | 11.6 |
| Coke Yield (Wt. %) | 8.6 | 12.2 | 11.6 | 11.9 |
| $H_2$ Yield (SCF/B)[1] | 67 | 248 | 409 | 281 |

[1] Standard cubic feet of $H_2$ gas per barrel of converted feedstock.
[2] Catalysts had been steam-aged at 760° C./4 hours.

TABLE II

| Catalyst | $C^1$ (Commercial; no V) | $D^1$ (Commercial; with V) |
| --- | --- | --- |
| Catalyst:Oil Weight Ratio | 7.0 | 7.0 |
| Conversion (Vol. %) | 83.0 | 82.1 |
| Gasoline Yield (Vol. %) | 68.0 | 61.0 |
| Coke Yield (Wt. %) | 10.6 | 12.8 |
| $H_2$ Yield (SCF/B) | 55 | 438 |

[1] Catalysts had been steam age at 760° C./4 hours.

Data in Table I clearly show that invention Catalyst B (zeolite embedded in high surface area silica matrix, containing 0.5 weight-% V as vanadium oxide) performed considerably better than control Catalyst A (zeolite embedded in high surface area silica matrix, containing 0% V), in terms of higher conversion and higher gasoline yield. This result is quite unexpected because of detrimental effect was realized by the deposition of vanadium on a commercial zeolite cracking catalyst (zeolite in a silica/alumina matrix), as shown by data in Table II.

Based on the above test results, it is concluded that a catalyst comprising a zeolite embedded in a high silica matrix (containing essentially no alumina) will remain an active catalyst (in terms of conversion and gasoline yield) during the cracking of a vanadium-containing heavy oil feed due to vanadium deposition of this catalyst, whereas a conventional catalyst comprising a zeolite in a silica-alumina matrix will deactivate when used for cracking of a vanadium-containing heavy oil feed.

EXAMPLE III

This example illustrates the effect of the initial surface area of the silica matrix (before steaming) of cracking catalysts on the cracking performance of silica-embedded zeolite catalysts after steaming at 760° C. (see Example I for streaming procedure). Cracking tests were performed in accordance with standard microactivity test procedure (MAT; ASTM D-3907-80) at 900° F., at a 3:1 catalyst:oil weight ratio, using 5.0 grams of catalyst and a gas oil feed having a boiling range (at 1 atm.) of 700°-900° F. MAT conversion data obtained using steamed and non-steamed catalysts (containing about 7-9 weight-% zeolite and about 90 weight-% silica; no vanadium) are plotted as a function of the initial surface area of the silica matrix (i.e., the surface area of the silica before its combination with zeolite and before any exposure to steam), as illustrated in FIG. 1.

The two graphs in FIG. 1 clearly show that the MAT conversion of zeolite/silica cracking catalysts, both fresh (non-steamed) and steam-treated (steamed), increased with increasing surface area of the silica matrix material (measured before any steam treatment). Based on these results, it is concluded that the cracking performance of the vandium oxide-containing catalysts of this invention will also be enhanced by employing silica of high surface area, preferably a BET/$N_2$ surface area of at least about 100 $m^2/g$, more preferably about 300–700 $m^2/g$.

Reasonable variations and modifications are possible within the scope of the disclosure and the appended claims.

That which is claimed is:

1. A composition of matter, effective as a cracking catalyst composition, comprising
   (a) zeolite,
   (b) silica matrix material, in which said zeolite is embedded, containing less than about 0.5 weight-% alumina, and
   (c) at least one vanadium oxide at a total level of at least about 0.2 weight-% V, based on the entire composition of matter.

2. A composition of matter in accordance with claim 1 wherein the BET/$N_2$ surface area of component (b) is in the range of from about 200 to about 1,000 $m^2/g$.

3. A composition of matter in accordance with claim 1 wherein the BET/$N_2$ surface area of component (b) is in the range of from about 300 to about 700 $m^2/g$.

4. A composition of matter in accordance with claim 1 comprising about 0.2 to about 2.0 weight-% V as vanadium oxide.

5. A composition of matter in accordance with claim 1 comprising about 0.3 to about 1.0 weight-% V as vanadium oxide.

6. A composition of matter in accordance with claim 1 wherein said zeolite is a zeolite Y having a BET/$N_2$ surface area of about 200–1,000 $m^2/g$.

7. A composition of matter in accordance with claim 1 wherein the weight ratio of said zeolite to said silica matrix material is in the range of from about 1:30 to about 1:1.

8. A composition of matter in accordance with claim 1 having a BET/$N_2$ surface area in the range of from about 100 to about 800 $m^2/g$.

9. A process for preparing a composition of matter, effective as a cracking catalyst composition, comprising the steps of
   (I) contacting (i) a material comprising zeolite embedded in a matrix material consisting essentially of silica with (ii) at least one vanadium compound, under such conditions as to incorporate said at least one vanadium compound (ii) into said material (i) at a level of at least about 0.2 weight-% V; and
   (II) heating the material obtained in step (I) in a free oxygen containing gas under such conditions as to substantially convert said at least one vanadium compound to at least one vanadium oxide.

10. A process in accordance with claim 9 wherein said material (i) comprises a zeolite Y and a silica matrix material having a BET/$N_2$ surface area in excess of about 100 $m^2/g$.

11. A process in accordance with claim 10 wherein said BET/$N_2$ surface area is in the range of from about 200 to about 1,000 $m^2/g$.

12. A process in accordance with claim 9 wherein said at least one vanadium compound used in step (I) is contained as impurity in a liquid hydrocarbon-containing feed stream at a concentration of at least 5 ppmw of V.

13. A process in accordance with claim 12 wherein said concentration is in the range of from about 5 to about 200 ppmw V.

14. A process in accordance with claim 12 wherein contacting step (I) is carried out at a temperature of from about 800° to about 1200° F.

15. A process in accordance with claim 9 wherein said heating step (II) is carried out at a temperature of from about 1100° to about 1300° F.

16. A process in accordance with claim 9 wherein the material obtained in step (I) is exposed, before step (II), to flowing steam having a temperature of from about 1,000° to about 1,500° F.

17. A process in accordance with claim 9 wherein the material obtained in step (II) is admixed with a material consisting essentially of material (i).

18. A process in accordance with claim 9 wherein the material obtained in step (II) contains about 0.2 to about 2.0 weight-% V as vanadium oxide.

19. A composition of matter, effective as a cracking catalyst composition, comprising:
   (a) zeolite,
   (b) matrix material, in which said zeolite is embedded, consisting essentially of silica having a surface area, measured by the BET method employing nitrogen, in excess of about 100 $m^2/g$, and
   (c) at least one vanadium oxide at a total level of at least about 0.2 weight-% V, based on the entire composition of matter.

* * * * *